United States Patent Office 3,553,711
Patented Jan. 5, 1971

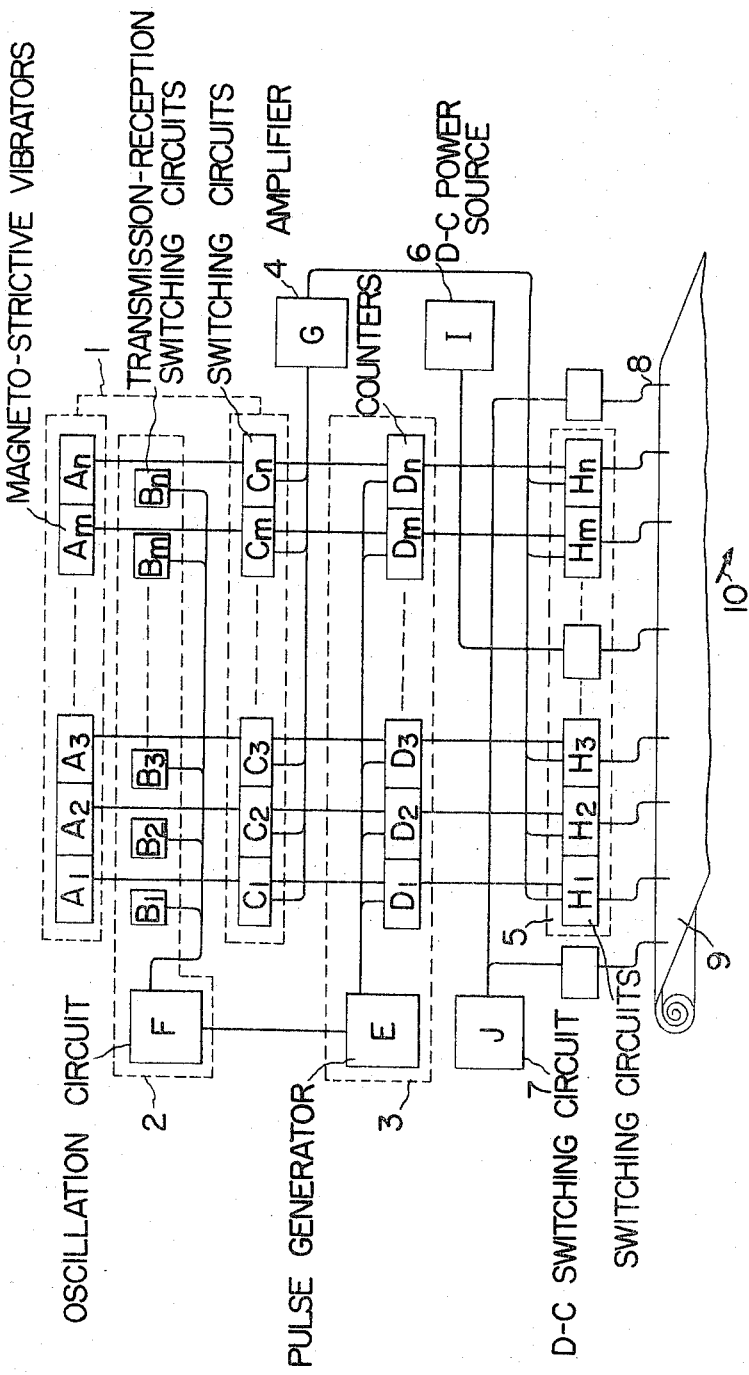

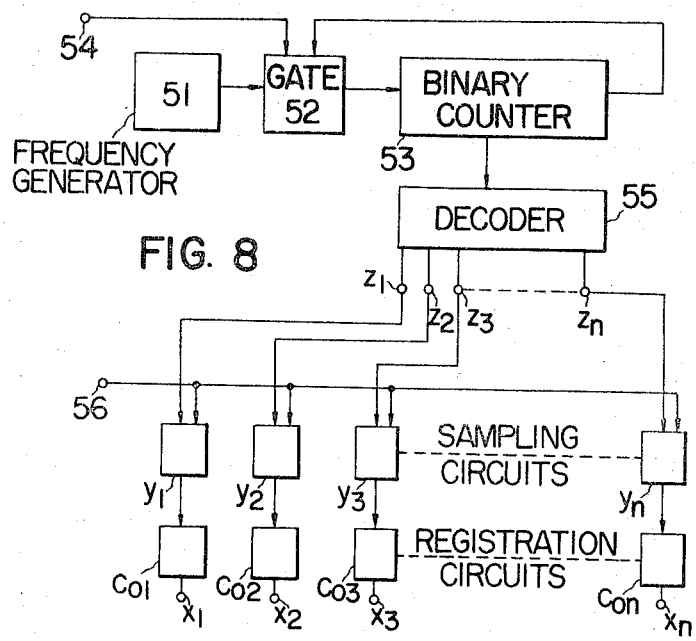
FIG. 8
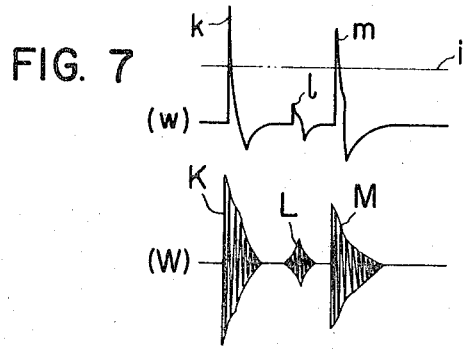
FIG. 7
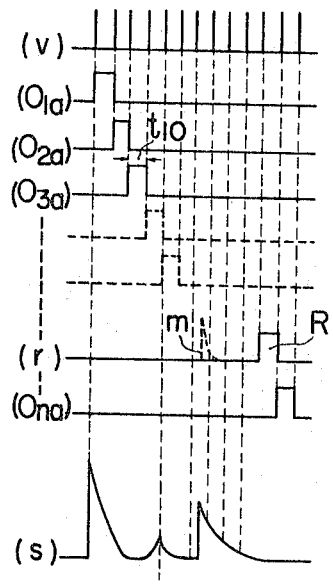

3,553,711
ECHO MEASURING AND RECORDING
Shizuo Kurimura and Kazuya Machida, Tokyo-to, and Tomio Hotta, Kawaguchi-shi, Japan, assignors to Kabushiki Kaisha Koden Seisakusho, Tokyo-to, Japan
Filed Apr. 12, 1968, Ser. No. 720,874
Claims priority, application Japan, Apr. 14, 1967, 42/23,389
Int. Cl. G01s 7/60
U.S. Cl. 346—33                                    7 Claims

ABSTRACT OF THE DISCLOSURE

Echo reception signals resulting from the transmission of detection signals are received by a sector-scanning receiver and switched and applied by a sequential switching device directly as analog signals successively and time-divisionally to several recording markers in parallel arrangement transversely across a moving recording paper, the switching device being activated by switching signals generated interrelatedly with the detection signals.

BACKGROUND OF THE INVENTION

This invention relates generally to the field of so-called "active" echo ranging, that is, the art of and means for sending out detection signals and receiving, recording, and indicating the resulting echo (or reflection) signals to detect and determine the existence and state of an echo object, an example of an echo-detecting apparatus or system for accomplishing such an operation being sonar. More particularly, the invention concerns a new active echo ranging system and recording and indicating means thereof.

Heretofore, for the recording and indicating means of a system of the above stated character, use has been made of magnified indication is considered to be a recording marker for traversing at a constant speed over a traveling continuous recording paper. By this method, however, it is not possible to effect high-speed traversing over a certain limit because of factors such as vibration accompanying the movement of the traversing mechanism of the recording marker. For this reason, the maximum limit of magnified indication is considered to be a recording limit of approximately 50 metres in recording paper of a width of 150 mm. That is, the extent of magnifying, recording, and indicating a measured distance of 1 metre as 5 mm. of width has been the limit.

In the case of telemetering or remote indication, furthermore, it is necessary to cause the recording marker traverse to be synchronizing with the signal for synchronizing the operations between the two points at which a detection signal is sent and received. However, in the case of a seine-net height meter, for example, when the period of the synchronizing signal changes abruptly, because of an abrupt fluctuation in the distance between the detected objects and the ship and accompanying occurrences such as tensioning of the seine-net warp disruption of the synchronism occurs because of the inertia of the traversing mechanism of the recording marker. Consequently, observation becomes impossible at a critical time, and this disruption in some cases leads to occurrences such as the loss of the seine net due to its being caught on a rocky bottom.

Furthermore, for use in detecting schools of fish, such apparatuses known heretofore have had disadvantages such as wear of the recording marker, problems due to vibration, limit to the recording speed, and difficulty in maintaining outside synchronism for recording. Because of these disadvantages and of other difficulties such as troublesome maintenance, high price, and problems of reliability, these apparatuses have not been satisfactory for this purpose.

SUMMARY OF THE INVENTION

It is an object of the present invention, summarily stated, to overcome the above described difficulties by providing an apparatus for echo measuring, recording, and indicating information having highly desirable characteristics.

According to the present invention, briefly summarized there is provided an apparatus for echo measuring, recording, and indicating which contains: (1) an organization of elements including a plurality of markers of multiple-electrode type in contact with the surface of a recording paper of electroconduction coloration type and means for switching and applying echo reception signals to be recorded, in their original form of analog values, successively and time-divisionally to the recording markers; (2) an organization of elements for establishing relationship between synchronism of the beginning of sweep of the switching and applying of the reception signals and the instants of transmission of detection signals and for establishing relationship between the switching sweep speed of the signal switching and application and measurement variables, e.g., depth, distance, angle, scale, and field; and (3) an organization of elements including electric charge storage means interposed between signal switching and applying means and the recording markers.

The nature, principle, details, and utility of the invention will be more clearly apparent from the following detailed description with respect to preferred embodiments of the invention when read in conjunction with the accompanying drawings, in which like parts are designated by like reference numerals and characters.

BRIEF DESCRIPTION OF THE DRAWINGS

In the drawings:

FIG. 5 is a schematic diagram, partly in block form and partly as a perspective view, showing the organization of a specific example of a circuit suitable for the apparatus according to the invention;

FIG. 7 is a pulse time chart showing examples of signal waveforms for a description of the operation of the apparatus shown in FIG. 6;

FIG. 8 is a block diagram showing the organization of one example of a recording device suitable for use in the echo measuring, recording, and indicating device of the invention.

DETAILED DESCRIPTION

Referring first to FIGS. 1 through 5 illustrating one example of an embodiment of the invention, the apparatus shown therein is capable of continuous recording and indicating in a sonar system of the so-called electronic sector-scanning type wherein high-speed scanning in a sector field is effected by means of an ultrasonic beam.

Figure 1:
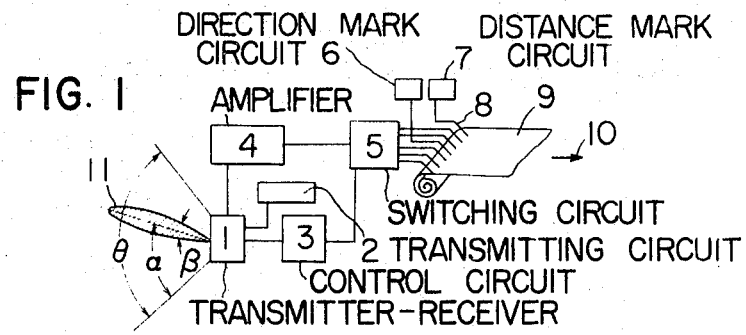
FIG. 1 is a schematic diagram, partly in block form and partly as a perspective view, indicating the organization of one example of an embodiment of the invention whereby continuous recording and indicating operation is possible.

The apparatus as shown in FIG. 1 comprises a transmitter-receiver 1, a transmitting circuit 2, a control circuit 3, an amplifying circuit 4 for amplifying received signals, a recording input switching circuit 5, a direction mark circuit 6, a distance mark circuit 7, a recording-marker group or battery 8, and means 10a for causing a continuous sheet of recording paper 9 to travel in the direction 10. Reference numeral 11 designates a reception directive beam.

Figure 2:
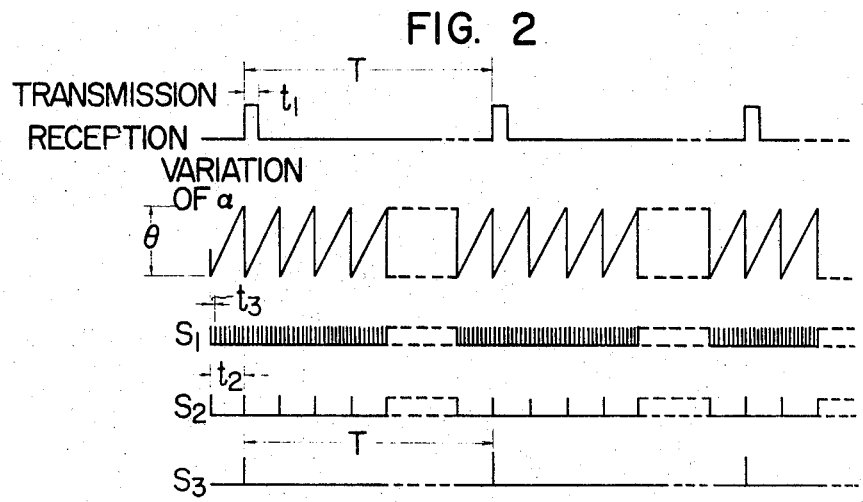
FIG. 2 is a graphical pulse time chart for a description of the operation of the apparatus shown in FIG. 1.

The transmitter-receiver 1 repeats transmission and reception operations within a detection period of a certain long time interval T in accordance with control means described hereinafter. At the time of transmission, the transmitter-receiver 1 accomplishes transmission during a transmission period of a certain short time interval $t_1$ over the entire scanning field $\theta$ which is to be detected and, at the time of reception, accomplishes reception by repeating reciprocating rotational scanning as the directional angle $\alpha$ is varied during a reception scanning period of a certain short time interval $t_2$ over the entire field $\theta$ of the sector, that is, accomplishing an operation as indicated in FIG. 2.

More specifically, this transmitter-receiver 1 has a structure wherein, for example, a large number of magnetostriction vibrator elements are provided, the same transmission power being imparted simultaneously to all elements at the time of transmission, and the directivity being caused to undergo rotational operation by a suitable combination of a delay circuit group and a switching circuit group at the time of reception.

The transmitting circuit 2 accomplishes the control operation of applying transmission energy to the transmitter-receiver 1 during transmission interval $t_1$ in each detection period T as described hereinabove in accordance with the operation of the operation control circuit 3 described hereinafter. This transmitting circuit 2 comprises, for example, a combination of an oscillator and a pulse keying circuit.

The control circuit 3 generates: (1) a switching-control pulse train $S_1$ having a period of time interval $t_3$ substantially equal to the time which results when the aforementioned reception scanning period $t_2$ is divided by the number of markers in the recording marker group 8 described hereinafter; (2) a reset-control pulse train $S_2$ having a period equal to scanning period $t_2$; and (3) a transmission-control pulse train $S_3$ having a period T which is $n$ times (several times), the scanning period $t_2$, that is, the detection period T.

The switching-control pulse train $S_1$ rotationally operates the reception directivity of the transmitter-receiver 1 and, at the same time, in synchronous relationship with this rotational operation, accomplishes sequential switching and connecting activation of the recording input switch circuit 5 described hereinafter. The reset-control pulse train $S_2$ accomplishes resetting activation to return the above mentioned rotational activation and sequential switching and connecting activation to the starting positions. The transmission-control pulse train $S_3$ accomplishes transmission activation of the transmitting circuit 3 as described hereinabove.

This control circuit 3 comprises, for example, a combination of means for generating stable pulses by means of a bridge oscillator, means for generating frequency-divided pulses by means of a binary circuit, and a ring counter.

The reception signal amplifying circuit 4 operates to amplify reception signals obtained by the transmitter-receiver 1 to signals suitable for recording activation described hereinafter and is a circuit capable of accomplishing detection and rectification as, for example, a transistor amplifying circuit.

The recording input switching circuit 5 operates in accordance with the switching-control pulse train $S_1$ from the control circuit 3 to maintain the analog value of the signals from the reception signal amplifying circuit 4 and to accomplish sequential switching and connecting activation with respect to markers of the recording marker group 8. This circuit 5 comprises, for example, a combination of switching circuits for sampling operation.

The direction mark circuit 6 operates to apply a steady signal to only some markers in the row of the recording marker group 8 described hereinafter in positions which are considered to be convenient for direction determination thereby to cause a direction mark line to be registered, and comprises, for example, a direct-current power source. The distance mark circuit 7 operates to apply an intermittent signal to only some markers in the row of the recording marker group 8 in positions which are considered to be convenient for distance determination thereby to cause distance marks to be registered and comprises a frequency-divided pulse generating circuit made up of a binary circuit receiving the reset-control pulse train $S_2$ generated by the control circuit 3.

Figure 3:
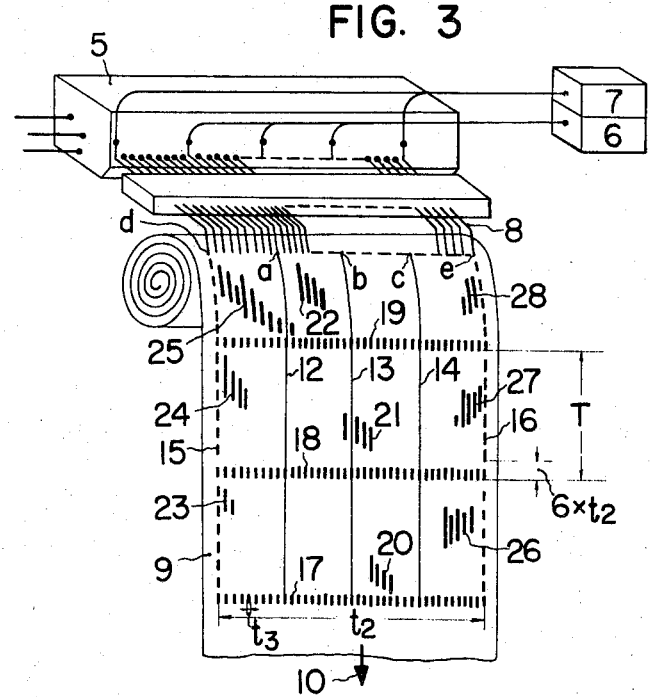
FIG. 3 is a simplified perspective view showing the organization of one example of the recording and indicating section of the apparatus shown in FIG. 1.

The recording marker group 8 comprises a large number of metal conductor wires parallelly and stationarily arranged in one row and insulated from each other, the registering ends thereof being caused to contact under elastic force the recording surface of the recording paper 9, and the other ends thereof being successively connected to respective output terminals of the recording input switching circuit 5. Each marker is, for example, a length of stainless steel wire with an insulation covering and a rhodium-plated registering tip, and all wires are arranged in a row as shown in FIG. 3 and partly held by fusion bonding by means of a resin such as polyethylene. The recording paper 9 is a recording paper capable of undergoing coloration when subjected to electric signals and is, for example, an electroconduction-coloration recording paper of the wet type.

Figure 4:
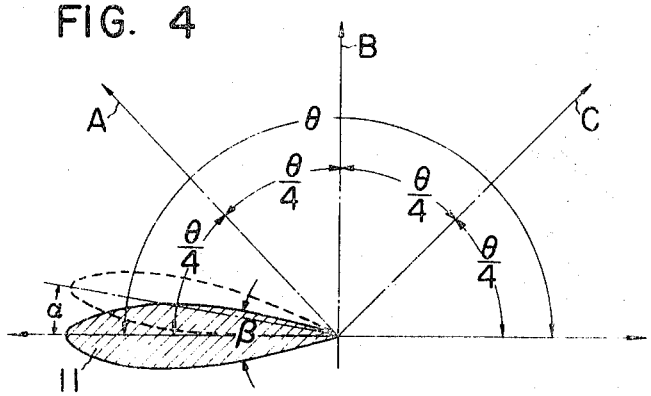
FIG. 4 is a graphical showing an example of a sector-scanning field set a 180 degrees of angle.

The recording operation is accomplished in the following manner. It will be assumed for the purposes of illustration that the echo detection apparatus is adapted to operate with underwater acoustic energy. In this apparatus, the scanning field $\theta$ for detection is set at 180 degrees of angle as indicated in FIG. 4, and direction mark lines are caused to appear at quartering directions thereof, that is, left 45 degrees direction, central direction, and right 45 degrees direction. Distance marks are caused to appear in the leftside direction and the right side direction.

In the case wherein the intermittent period of the distance marks is caused to be six times the period $t_2$ of the reset-control pulse train $S_2$, a register image as illustrated in FIG. 3, for example, is obtained. More specifically, the output of the direction mark circuit 6 is applied to markers $a$, $b$, and $c$ at positions corresponding to points quartering the total number of markers in the recording marker group 8 thereby to cause registering of direction mark lines 12, 13, and 14, respectively. At the same time, the output of the distance mark circuit 7 is applied to markers $d$ and $e$ positioned at the two lateral sides thereby to cause registering of distance marks 15 and 16.

By causing the reception signals at the time of transmission during the transmission interval $t_1$ to be registered as transmission images 17, 18, and 19, the detection recordings of the successive record cycles are successively accumulated and indicated with transmission images 17, 18, and 19 forming boundaries between adjacent recordings.

When first images 20, 23, and 26 of schools of fish, for example, appear successively as images 21, 24, and 27 and then as 22, 25, and 28, is can be readily judged that the school of fish image 20 is moving toward the left at a higher speed than the ship on which the apparatus is installed, tat the school of fish image 26 is moving toward the right at the same speed as the ship, and that the school of fish image 23 is moving toward the ship and toward the right.

The circuit illustrated in FIG. 1 is shown in FIG. 5 in the form of an example in more specific detail. This circuit is a combination of magnetostrictive vibrator elements $A_1, A_2, A_3 \ldots A_m, A_n$, transmission-reception switching circuits $B_1, B_2, B_3 \ldots B_m, B_n$ such as T.R. circuits in which diodes are used, a combination of delay elements and switching elements $C_1, C_2, C_3 \ldots C_m, C_n$, series-connected counters $D_1, D_2, D_3 \ldots D_m, D_n$, a combination E of a pulse generating circuit and frequency-dividing circuits, an oscillation circuit F for transmission, a reception signal amplifying circuit G, switching circuits $H_1, H_2, H_3 \ldots H_m, H_n$ of analog-sampling type, a D-C power source I, and a D-C switching circuit J. The circuit parts designated by reference numerals 1 through 9 accomplish the respective operations of the parts designated by the same numerals in FIG. 1.

The organization of the detection apparatus as described above and as illustrated in the drawings can be modified as follows according to the invention. For example, the scanning field is not limited to a sector but may be omnidirectional, one method being to cause the scanning to undergo rotation in one direction and to synchronize the switching sweep with this rotation. As another example, a transmitter and a receiver as separate units may be used in place of the transmitter-receiver 1. In another modification, a sequential switching and connecting means in which a matrix circuit is employed may be used in place of the series-connected counter circuits $D_1, D_2, D_3 \ldots D_m, D_n$.

Still other possible modifications are: to omit the direction mark circuit 6 and connect the marker for direction mark lines also to the distance mark circuit 7 thereby to register the direction marks also in the form of distance marks; to use recording markers of different widths for the direction and distance mark markers and other markers thereby to facilitate further the analysis of the registered record; and to adapt the apparatus so that each of the periods T, $t_2$, and $t_3$ and angle $\theta$ can be varied for the purpose of increasing the adaptability of the detection distance and scanning field with respect to multiple uses. Furthermore, the detection apparatus of the invention is not limited in use to uunderwater acoustic ranging but can be adapted to record and indicate information obtained through radar.

In the example of the invention as described above and as illustrated by FIGS. 1 through 5, switching and connecting operation is carried out so that a detection signal, in the interval $t_2$ as indicated in FIG. 2, is applied in the original form of an analog signal to all recording markers in a time-divisional manner at intervals of $t_3$. The manner in which this operation is accomplished will be more clearly apparent from a consideration of the following description with respect to an example of a preferred embodiment of the invention as applied to a detection apparatus adapted to operate doubly as a net height meter and as a fish school detector, reference being made to FIGS. 6 and 7.

A detection part of the system is installed on the net side for the purpose of measuring the net height or degree of opening of the net and transmits measured signals to a receiver 31 of the apparatus. Since this detection part is a device similar to a miniaturized telemetering station of general type depending on ultrasonic communication means, it is not shown in detail in the drawings.

Figure 6:
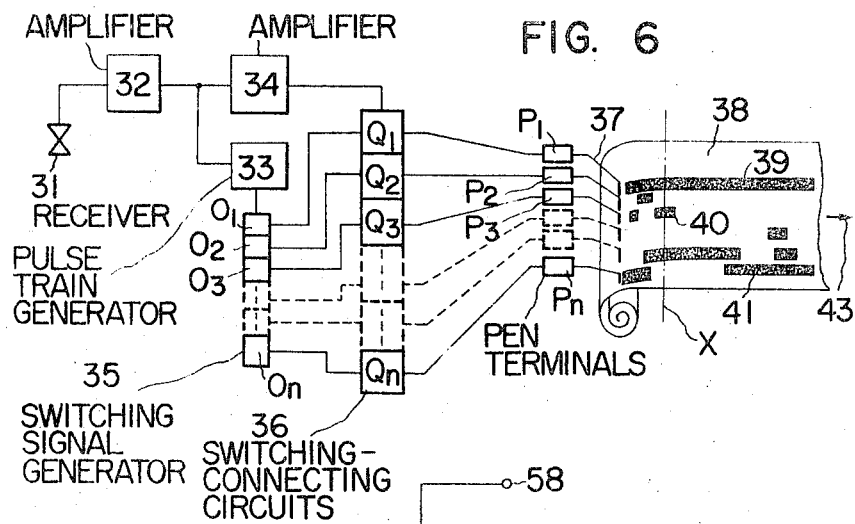
FIG. 6 is a schematic diagram, partly in block form and partly as a perspective view, showing the organization of another embodiment of the invention.

Referring to FIG. 6, the receiver 31 is, for example, a receiver having a ferrite vibrator as its principal element and produces an output, i.e., reception signals, which are amplified directly in their original state as analog values by a reception amplifier 32. The amplifier 32 is, for example, a transistor amplifying circuit, and the output thereof, still in the form of analog values is amplified into an output suitable as recording signals by an amplifier 34 for recording. The amplifier 34 is, for example, a transistor amplifier. To the output side of the reception amplifier 32, there is also connected a pulse train generator 33 for generating a serial pulse train in response to the first received transmission signal for detection of the reception signals, which pulse train generator 33 is, for example, a clamped oscillator.

A sequential switching signal generator 35 operates in response to the pulses of the output pulse train of the pulse train generator 33 to apply gate inputs successively to connection circuits $Q_1, Q_2, Q_3 \ldots Q_n$ described hereinafter as it causes successive switching shifts in the sequence of elements $O_1, O_2, O_3 \ldots O_n$. This sequential switching signal generator 35 is a circuit such as, for example, a shift register with automatic resetting in which a group of flip-flop circuits are connected in cascade arrangement.

A switching-connecting circuit group 36 made up of connecting circuits $Q_1, Q_2, Q_3 \ldots Q_n$ for switching and connecting the output of the amplifier 34 in the original analog value state successively to pen terminals $P_1, P_2, P_3 \ldots P_n$ of a stationary parallel recording pen group 37 described hereinafter is caused to operate by the above mentioned gate inputs applied by elements $O_1, O_2, O_3 \ldots O_n$ and is a sampling gate circuit for analog values. More specifically, this circuit 36 is, for example, a circuit in which the output of the reception amplifier 32 is applied to collector sides of a group of transistors, the emitter sides of which are respectively connected through capacitors to the recording marker terminals $P_1, P_2, P_3 \ldots P_n$, and gate inputs are applied by elements $O_1, O_2, O_3 \ldots O_n$ respectively to the base sides of these transistors.

The recording marker group 37 is adapted to register recordings on a recording paper 38. The recording marker group 37 comprises a group of markers insulated by suitable means and arranged in parallel side-by-side arrangement with their respective points in contact with the surface of the recording paper 38 under elastic force. The recording paper is, for example, of the so-called wet type which undergoes coloration when subjected to electric current and is caused by driving and guiding means 38a to travel in the direction 43. The markers of the recording marker group 37 register respective images such as, for example, images corresponding to transmission signals for detection, i.e., a transmission signal image 39, a fish school image 40, and a sea-bottom image 41.

When a repetition of a signal such as signal W indicated in FIG. 7 is being sent by a detection station (not shown) and received by the receiver 31, the reception signal is directly amplified and detected in the reception amplifier 32 and, passing through circuits such as differentiating and clipper circuits at the input part of the pulse train generator 33, is rendered into a signal such as signal $w$, which functions as a trigger pulse to derive a pulse $k$.

That is, by the operation of the differentiating circuit, a transmission signal K becomes pulse $k$, a fish school signal L becomes a pulse $l$, and a bottom signal M becomes a pulse $m$, and by the operation of the clipper circuit, the signals are sliced at a level of, for example, $i$, whereby pulses $k$ and $m$ are derived, and only pulse $k$ is selected by means of a circuit such a bistable circuit.

This pulse $k$ is applied as a trigger pulse to a pulse train signal L becomes a pulse $l$, and a bottom signal M begenerator depending on a clamped oscillator thereby to generate a continuous pulse train such as signal $v$.

This signal $v$ is applied to the sequential switching signal generator 35, and for each pulse of signal $v$, switching shifts are caused successively in the sequence of $O_1, O_2, O_3 \ldots O_n$ thereby to cause successive generation of rectangular-waveform pulses having constant pulse widths $t_1$ as indicated by signals $(O_{1a}), (O_{2a}), (O_{3a}) \ldots (O_{na})$ in FIG. 7. These signals $(O_{1a})$, $(O_{2a})$, $(O_{3a})$ . . . $(O_{na})$ are applied as gate inputs respectively to circuits $Q_1$, $Q_2$, $Q_3$ . . . $Q_n$ of the switching-connecting circuit group 36, one of which is caused to undergo sequential switching conducting operation during a time interval $t_{10}$.

On one hand, since a signal $s$ resulting from the amplification of the output of reception amplifier 32 by amplifier 34 for recording to an output suitable for recording by application thereof to the recording markers is being applied as a signal input to circiuts $Q_1$, $Q_2$, $Q_3$ . . . $Q_n$ of the switching-connecting circuit group 36, signals resulting from successive sampling during time interval $t_{10}$ of this signal $s$ (that is, an analog signal substantially similar to the reception signal) are applied successively to the marker terminals $P_1$, $P_2$, $P_3$ . . . $P_n$ of the recording marker group 37.

Consequently, in the case wherein the reception signal is a signal such as signal W, recorded and indicated images such as to correspond to the position indicated by dot-and-dash line X in FIG. 6 on the recording paper 38 are obtained. That is, the measured distance is indicated by a digital value determined by the installed positions of the recording markers and the time rate of the pulses of the signal $v$ generated by pulse train generator 33, and the concentration of the recorded image, that is, the strength of the reception signal image, is indicated by an analog value proportional to the strength of the signal received while the reception signal is being applied to to each recording marker, that is, during time interval $t_{10}$.

Therefore, since the synchronous scanning (sweep) is purely electrical, there is no physical inertia, and the advantageous possibility of prompt follow-up, even in cases of fluctuation of the synchronous signal phase, can be fully utilized. Accordingly, follow-up can be readily realized even with respect to considerable fluctuation of the synchronous signal phase due to the tensioning of the warp, for example, in the case of the aforementioned net height meter. Thus, the aforementioned difficulties encountered heretofore can be overcome. Moreover, since the recorded image is indicated by an analog value which is of the same concentration as the reception signal, it is possible to analyze the images in the same manner as in the case of a conventional echo recording with which operators have heretofore become familiar.

Furthermore, in a system, such as that of a fathometer or a detector for vertical depths of fish nets, wherein simultaneously with the reception of a bottom signal or after a specific short delay time therefrom, a detection signal is automatically transmitted, and the number of cycles of detection is automatically varied in accordance with the distance or depth being measured, only indicating means depending on a cathode-ray (Braun) tube could heretofore be used, and there has been a need for recorded indication. Such recorded indication has been made possible by the present invention.

More specifically, a feature of the apparatus illustrated in FIG. 6 is that it can be used to achieve the above described purpose by combining therewith a transmitter for detection, selecting a pulse $m$ from the signal $w$ indicated in FIG. 7, applying this pulse $m$ to means such as a monostable multivibrator to form a pulse R delayed by a specific short time interval as in signal $r$, and applying this as a reset pulse of the sequential switching signal generator 35 and a transmission trigger pulse of the transmission signal for detection.

Furthermore, when it is required that the detection direction be divided into the up-and-down direction and the left-and-right direction, and that both directions be indicated on the same single indication surface, it is necessary to divide the recording markers alternately left and right of the center and cause them to operate at these positions. Moreover, it is further necessary to cause these markers to operate in synchronism respectively with synchronizing signals, that is, respectively with the detection signals of both directions. For this reason, it has been structurally difficult to construct such an embodiment in a simple manner. Furthermore, as mentioned hereinbefore, in the case where the period of a signal to become a synchronizing signal changes abruptly as in the case of remote communication, it has been impossible to attain fully synchronization.

By the practice of the present invention, however, such an apparatus can be readily realized by providing an additional combination of the sequential switching signal generator 35, the switching-connecting circuit group 36, and the recording marker group 37, arranging this recording marker group to be alined upward with the recording marker corresponding to terminal $P_1$ of the recording marker group 37 shown in FIG. 6 positioned as an initial point, and arranging the circuit so that pulses from the pulse train generator 33 are switched and applied in accordance with the transmission signals of the two directions alternately to the two sequential switching signal generators 35.

The scope of measurement, that is, the distance or measurement field, can be varied in a simple manner by merely changing the pulse generation rates (i.e., the pulses per second) of the pulse trains. By providing two pulse generators having different pulse generation rates and causing them to undergo switching operation, it is possible to indicate readily one part in the measurement field on a further magnified scale or, conversely, on a reduced scale.

By providing the transmitting circuit TC, as shown in dotted lines, the device becomes an echo measuring device like an ordinary sounding machine, and also by switching a pulse rate changer PRC for changing the pulse rate of the pulse train generator 33, as shown with dotted lines (for example, an operating switch for varying the value C or R of a CR multivibrator), the measuring range can simply be switched and varied.

While, in the apparatus described above and illustrated in the drawings, the trigger pulse for starting pulse train generation in the pulse train generator 33 is obtained by means for selectively deriving a transmission signal out from the reception signal, in an echo measurement apparatus, in general, it is possible to make a change whereby transmission signals are derived directly from a transmitter for detection and application.

It is possible, moreover, to provide a recording device of even higher performance through modifications such as: (1) removing the pulse train generator and modifying the structure of the device to that wherein the sequential switching signal generator 35 itself applies the trigger pulse, whereby sequential switching signals are automatically generated to accomplish resetting; (2) using means for obtaining parallel signals (codes) and a decoder instead of means for directly obtaining serial signals (codes) for the sequential switching signal generating means thereby to convert the means into one for obtaining indirectly serial signals (codes); and (3) adapting the switching-connecting circuit group 36 to include, essentially, amplifying and rectifying functions thereby to have an amplifying effect for recording by a circuit modification wherein, for example, a D-C power source is connected to the collector sides of the transistors, the emitter sides thereof are respectively connected through capacitors to the recording marker terminals, and to each base side there are applied a bias voltage for establishing a normally nonconductive state, signals from the reception amplifier, and sequential switching signals.

Figure 9:
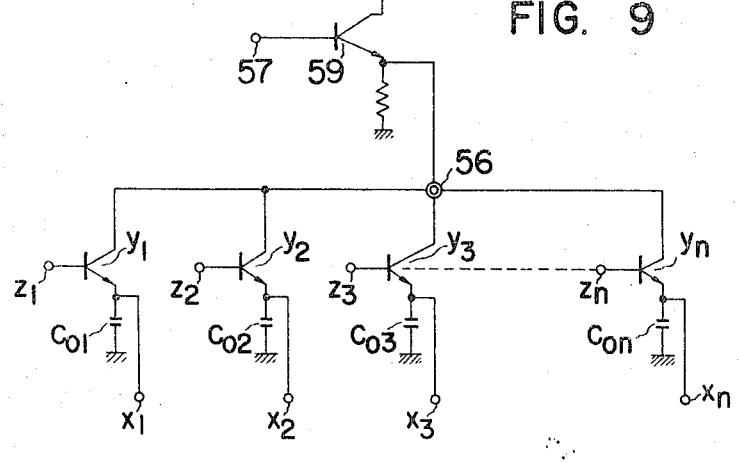
FIG. 9 is a circuit diagram showing a specific example of an actual circuit for reducing the embodiment indicated in FIG. 8 to practice.

An example of a recording device of this character according to the invention as illustrated in FIGS. 8 and 9 will now be described.

In the device shown in FIG. 8, there is provided a suitable frequency generating section 51 comprising a circuit such as an oscillation circuit of known type or a frequency-dividing circuit contiguously following an oscillation circuit. A gate circuit 52 operates to apply the output of the suitable frequency generating section 51 as an input signal to a binary counter 53 only during a predetermined time interval. The gate circuit 52 is connected to a synchronizing signal input terminal 54, which receives a transmission pulse signal in the case of a fish school detector or a trigger pulse signal synchronized with a reception recording signal delayed by a specific delay time form the tarnsmission pulse thereby to start the gate circuit 52.

The output of the frequency generating section 51 is thus applied to the binary counter 53, which thereupon commences counting and, after a predetermined quantity has been reached, produces an output to stop the operation of the gate circuit 52 and thereby to interrupt the input of the binary counter 53. A decoder circuit 55 of known type composed principally of diodes and transistors combines the outputs of the binary counter 53 and sends a plurality of gate pulses of a specific pulse width successively and continuously with respect to time to terminals $z_1, z_2, z_3 \ldots z_n$.

Sampling circuits described hereinafter are provided with a common, recording signal input terminal 56, to which an amplified detection signal of the reception signal in, for example, a fiish school detector is applied. The relationship between this recording signal and the above mentioned gate pulses may be described as follows in conjunction with a voltage waveform time chart.

That is, signal ($s$) indicated in FIG. 7 of the preceding example is applied to the recording signal input terminal 56, while signals $(O_{1a}), (O_{2a}), (O_{3a}) \ldots (O_{na})$ indicated in FIG. 7 are caused by the synchronizing signal from the synchronizing signal terminal 54 of the device shown in FIG. 8 to begin operation and become gate pulse signals formed by the gate circuit 52, binary counter 53, and decoder 55 and applied to terminals $z_1, z_2, z_3 \ldots z_n$. These gate pulse signals and the recording signal through terminal 56 are applied respectively to sampling circuits $y_1, y_2, y_3 \ldots y_n$ shown in FIG. 8, the outputs of which are so-called sampling pulses, which are applied respectively to registration circuits $C_{01}, C_{02}, C_{03} \ldots C_{0n}$ of the succeeding stage. These registration circuits apply smoothing currents respectively corresponding to the wave height values of the sampling pulses to corresponding recording markers $x_1, x_2, x_3, \ldots x_n$ disposed parallelly in a row in the succeding stage. Accordingly, currents flow through the electrolytic coloration or wet-type recording paper with which the markers are in contact thereby to cause electrolysis and coloration in the recording paper, whereupon a recording in accordance with the strength of each of the aforementioned recording signals is obtained.

A practical example of an actual circuit suitable for the above described organization is illustrated in FIG. 9. A recording signal is introduced into this circuit through a recording signal input terminal 57 and is power amplified by an emitter-follower circuit composed of a transducer 59 operated by a D–C power source (not shown) connected to a D–C power source terminal 58. The recording signal thus amplified is applied to a common terminal 56 connected commonly to the collectors of transistors $y_1, y_2, y_3 \ldots y_n$ constituting the aforementioned sampling circuits respectively of the same designations. The other reference characters in FIG. 9 designate parts respectively equivalent to the parts designated by the same characters in FIG. 8.

The entire circuit can be described as follows with respect to the circuit transformer $y_1$. A gate signal is applied through a gate pulse input terminal $z_1$ to the base of transistor $y_1$. The transistor $y_1$ becomes conductive only during the application of this gate signal and passes current through its emitter to charge a capacitor $C_{01}$. It is apparent that the quantity of the charge thus stored is proportional to the amplitude of the recording signal applied through terminal 56 at the time of generation of the aforementioned gate pulse.

This charge stored in capacitor $C_{01}$ then flows by way of the recording marker $x_1$ through the recording paper, which thereupon undergoes coloration corresponding to the magnitude of the charge. Thus, the optimum organization and conditions are attained with respect to the recording paper of electrolytic coloration type, which undergoes coloration when subjected to a current due to a low voltage. The circuits of the other transistors $y_2, y_3 \ldots y_n$ all operate in the same manner as described above to cause their respective recording pens $x_2, x_3 \ldots x_n$ to register recordings.

Thus, the above described device according to the invention comprises a suitable frequency generator to produce output signals, means for generating a large number of gate pulses in successive sequence with respect to time with a specific pulse width, these gate pulses being synchronized with recording signals on the basis of the above mentioned output signals of the frequency generator, means operating in response to the gate pulses to sample the recording signals, and means for storing charges corresponding to the amplitudes of the sampled signals and applying the charges thus stored respectively to corresponding recording markers disposed parallelly in a row thereby to accomplish recording.

Therefore, particularily in the case where a recording paper of electrolytic coloration is used, it is possible to cause the sampling circuits $y_1, y_2, y_3 \ldots y_n$ to assume the additional function of power amplification for recording and, moreover, to use miniature, low-output, and low-price elements for the active elements such as transistors.

Furthermore, since the speed with which the recording markers slide over the surface of the recording paper is much less than that of conventional recording devices of recording marker travel type, the rate of wear of the recording markers is low, which feature is highly convenient for the user.

As described above, the present invention affords not only low wear rate of the recording markers and recording at very high speeds but also simple variability of the recording speed and very simple synchronization from the outside. Accordingly, when the apparatus of the invention is used for fish school detection, the various advantageous features of the invention such as high-speed scanning, possibility of outside synchronism, and arrangement of numerous recording markers make possible and facilitate modes of detection and recording which were heretofore considered to be almost impossible. Examples of these modes of detection and recording are: detection of ultra-shallow schools of fish; simultaneous recording on a single recording paper of information on schools of fish traveling in a plurality of directions (divisional scanning wherein recordings are registered toward both edges from the center of the recording paper being possible); and magnification, recording, and simultaneous recording on a single recording paper of recording signals.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What we claim is:

1. An apparatus for echo recording comprising a recording device having means to move recording paper of the electrolytic coloration type in the plane thereof, a plurality of recording markers parallelly arranged transversely across said paper, means to transmit transmission signals for detection, means to generate sequential switching signals in relationship with said transmission signals connected to said transmission means, means to receive echo reception signals, means operated by said sequential switching signals to switch and connect said reception signals to said markers, registration circuits connected to said markers for storing charge corresponding to the amplitude of said reception signals and applying current to said paper in accordance with said charges.

2. An apparatus for echo measuring according to claim 1, wherein said means to generate sequential switching signals comprises a pulse train generator for generating a serial pulse train in response to the first received transmission signal and a switching signal generator connecting said serial pulse train successively to said switching and connecting means as gate inputs to allow said reception signals to be applied serially to said markers.

3. An apparatus for echo measuring according to claim 2, further comprising means for varying the recording range of said signals by varying the pulse generator rate of said pulse train generator.

4. An apparatus for echo measuring according to claim 2, further comprising an additional sequential switching signal generator, an additional means for switching and connecting said reception signals and an additional plurality of markers aligned upward of said first plurality of markers whereby said serial pulse train is applied in two directions alternately to said sequential switching generators.

5. An apparatus for echo measuring according to claim 1 wherein said means to generate sequential switching signals comprises frequency generator means, means for binary counting of said transmission signals synchronously with reception signals, gate means connected to said frequency generator and said binary counter for generating a plurality of gate pulses of specific width successively with respect to time in accordance with the result of said binary counting, decoder means responsive to said gate pulses to sample said reception signals and produce sample signals and apply them to said switching and connecting means.

6. An apparatus for echo measuring according to claim 1 further comprising means for rotational scanning of direction by a plurality of transducer means, said means to generate sequential switching signals operating interrelatedly with said rotational scanning means to switch and connect said reception signals successively to said recording markers to thereby cause said markers to register recordings with said direction of movement of the recording paper as a detection of distance coordinates and the transverse direction as a scanning direction coordinate, recordings for successive cycles being recorded and indicated in a successively accumulative manner in the direction of movement of the recording paper.

7. The apparatus according to claim 1 particularly for recording an indication of the state of a fish net and surrounding conditions, said apparatus further comprising telemetering detection means installed on the net side for sending telemetered signals, said means to generate sequential switching signals generating said switching signals in relationship with said telemetered signals, and means responsive to said switching signals applying the telemetered signals successively to said recording markers.

References Cited
UNITED STATES PATENTS

| | | | |
|---|---|---|---|
| 2,623,116 | 12/1952 | Rymes | 346—33X |
| 2,739,865 | 3/1956 | Willey | 346—33 |
| 2,955,284 | 10/1960 | Thorsen | 343—11 |
| 3,050,580 | 8/1962 | Schwertz | 346—35X |
| 3,091,762 | 5/1963 | Schwertz | 343—11 |

JOSEPH W. HARTARY, Primary Examiner

U.S. Cl. X.R.
346—35, 74; 340—3